US012811470B2

(12) United States Patent
Tabuchi et al.

(10) Patent No.: US 12,811,470 B2
(45) Date of Patent: Nov. 24, 2026

(54) ROTOR

(71) Applicant: TOYOTA JIDOSHA KABUSHIKI KAISHA, Toyota (JP)

(72) Inventors: Kenta Tabuchi, Nisshin (JP); Hiroki Kato, Toyota (JP); Hideaki Miyazono, Kasugai (JP); Kiichi Yokoyama, Toyota (JP); Hironori Asaoka, Okazaki (JP); Fumiaki Yamato, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 18/530,969

(22) Filed: Dec. 6, 2023

(65) Prior Publication Data

US 2024/0195266 A1 Jun. 13, 2024

(30) Foreign Application Priority Data

Dec. 7, 2022 (JP) ................................ 2022-195894

(51) Int. Cl.
*H02K 9/08* (2006.01)
*H02K 1/2706* (2022.01)

(52) U.S. Cl.
CPC ............ *H02K 9/08* (2013.01); *H02K 1/2706* (2013.01)

(58) Field of Classification Search
CPC .... H02K 1/276; H02K 1/2766; H02K 1/2773; H02K 1/32
See application file for complete search history.

(56) References Cited

U.S. PATENT DOCUMENTS

| | | | | |
|---|---|---|---|---|
| 11,205,931 B2 * | 12/2021 | Fröhlich | ................ | H02K 1/185 |
| 2012/0299403 A1 * | 11/2012 | Stahlhut | .................. | H02K 1/32 310/59 |
| 2014/0084720 A1 * | 3/2014 | Claramunt Estecha | . | H02K 1/27 310/156.19 |
| 2016/0261158 A1 * | 9/2016 | Horii | ........................ | H02K 1/32 |
| 2016/0322874 A1 * | 11/2016 | Yoshinori | ................ | H02K 1/32 |
| 2019/0115810 A1 * | 4/2019 | Kinpara | ................. | B21D 28/02 |
| 2019/0356187 A1 * | 11/2019 | Fröhlich | ................ | H02K 1/185 |
| 2020/0186007 A1 * | 6/2020 | Kitao | ..................... | H02K 15/03 |

(Continued)

FOREIGN PATENT DOCUMENTS

| | | |
|---|---|---|
| JP | 2006-67777 A | 3/2006 |
| JP | 2011172441 A * | 9/2011 |

(Continued)

OTHER PUBLICATIONS

JP2011172441A transaltion (Year: 2011).*

*Primary Examiner* — Oluseye Iwarere
*Assistant Examiner* — Nicholas Lee Setzer
(74) *Attorney, Agent, or Firm* — Sughrue Mion, PLLC

(57) ABSTRACT

A rotor may include: a rotor shaft; a rotor core attached to the rotor shaft and comprising a plurality of magnet slots and magnets, wherein at least one magnet of the magnets has an elongated cross-sectional shape and is fixed by being pressed against a part of an inner surface defining a corresponding one of the magnet slots of the rotor core. The rotor is configured so that coolant flowing through the rotor shaft reaches a surface of a long side of the at least one magnet that is exposed inward in a radial direction of the rotor core in the corresponding magnet slot and moves along an axial direction of the rotor core.

7 Claims, 3 Drawing Sheets

(56) References Cited

U.S. PATENT DOCUMENTS

| | | | | |
|---|---|---|---|---|
| 2020/0212743 | A1* | 7/2020 | Matsumoto | H02K 1/276 |
| 2020/0259380 | A1* | 8/2020 | Ikemoto | H02K 1/32 |
| 2022/0224177 | A1* | 7/2022 | Sakamoto | H02K 9/197 |
| 2022/0224178 | A1* | 7/2022 | Sakamoto | H02K 1/276 |
| 2023/0291260 | A1* | 9/2023 | Sawahata | H02K 1/32 |
| 2024/0195248 | A1* | 6/2024 | Asaoka | H02K 1/2766 |

FOREIGN PATENT DOCUMENTS

| | | | |
|---|---|---|---|
| JP | 2020-096474 | A | 6/2020 |
| JP | 2021-191034 | A | 12/2021 |
| JP | 2022-045542 | A | 3/2022 |
| WO | 2015/091075 | A1 | 6/2015 |
| WO | 2019/008820 | A1 | 1/2019 |

* cited by examiner

ROTOR

REFERENCE TO RELATED APPLICATION

This application claims priority from Japanese Patent Application No. 2022-195894 filed on Dec. 7, 2022. The entire content of the priority application is incorporated herein by reference.

TECHNICAL FIELD

The art disclosed herein relates to a rotor.

BACKGROUND

A rotor constitutes a motor with a stator core. A rotor core is a cylindrical body having magnets in magnet slots defined within the rotor core, and has a rotor shaft at its center. The magnets held within the rotor core need to be cooled when the motor operates. For example, a structure where surfaces of short sides of magnets housed in magnet slots are cooled is known (Japanese Patent Application Publication No. 2022-45542).

SUMMARY

The cooling of only the surfaces of the short sides was not however sufficient to cool entireties of the magnets.

The present teachings provide an art configured to effectively cool magnets held in a rotor core.

The art disclosed herein is embodied by a rotor. The rotor may comprise: a rotor shaft; a rotor core attached to the rotor shaft and comprising a plurality of magnet slots and magnets, wherein at least one magnet of the magnets has an elongated cross-sectional shape and is fixed by being pressed against a part of an inner surface defining at least one corresponding magnet of the magnet slots of the rotor core. The rotor is configured so that coolant flowing through the rotor shaft reaches a surface of a long side of the at least one magnet that is exposed inward in a radial direction of the rotor core in the at least one corresponding magnet slot and moves along an axial direction of the rotor core.

According to the rotor disclosed herein, the coolant flowing through the rotor shaft reaches the surface(s) of the long side(s) of the magnet(s) inside the at least one magnet slots and moves along the axial direction of the rotor core. The magnet(s) have the surface(s) of their long side(s) cooled by the coolant, thus the magnet(s) are effectively cooled.

DETAILED DESCRIPTION

Figure 1A:
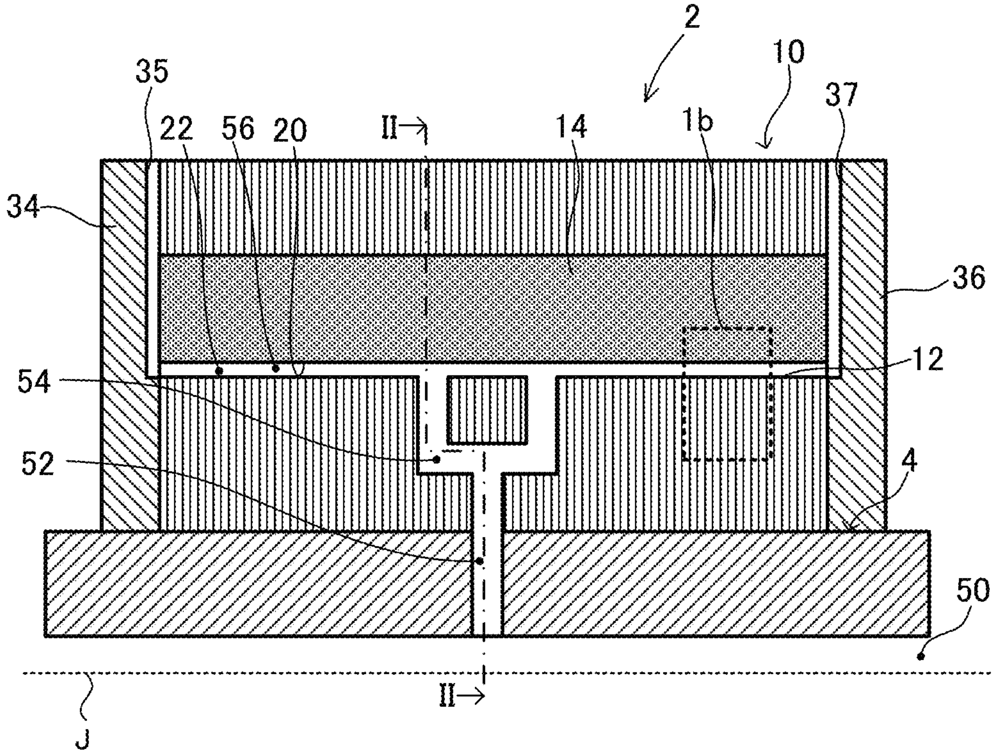
FIG. 1A illustrates a cross-sectional structure of a rotor disclosed herein according to one embodiment along an axial direction of the rotor.

A rotor disclosed herein may comprise: a rotor shaft; a rotor core attached to the rotor shaft and comprising a plurality of magnet slots and magnets, wherein at least one magnet of the magnets has an elongated cross-sectional shape and is fixed by being pressed against a part of an inner surface defining at least one corresponding magnet slot of the magnet slots of the rotor core, wherein the rotor is configured so that coolant flowing through the rotor shaft reaches a surface of a long side of the at least one magnet that is exposed inward in a radial direction of the rotor core in the at least one corresponding magnet slot and moves along an axial direction of the rotor core.

In an aspect of the present disclosure, the rotor may further comprise: a first flow path which communicates with a coolant flow path flowing through inside the rotor shaft and extends to be oriented outward in the radial direction toward the long-side surface in the rotor core; and a second flow path which extends from the first flow path outward in the radial direction along the long-side surface. By virtue of this configuration, the coolant can be effectively supplied from inside the rotor shaft to the surface(s) of the long side(s) of the magnet(s).

In an aspect of the present disclosure, the second flow path may extend from radially inside the long-side surface to radially outside the long-side surface. By virtue of this configuration, the magnet(s) can be effectively cooled.

In an aspect of the present disclosure, the second flow path may extend from the long-side surface to a short-side surface of the at least one magnet which is exposed continuously to a radially outer side in the at least one corresponding magnet slot in the radial direction of the rotor core. By virtue of this configuration, the magnet(s) can be cooled over a greater area.

In an aspect of the present disclosure, the second flow path may comprise a coolant flow blocker which blocks the coolant from flowing inward in the radial direction of the rotor core. By virtue of this configuration, the coolant can be made to reach the surface(s) of the long side(s) against centrifugal force generated by the rotation of the rotor core, by which the magnet(s) can be effectively cooled.

In an aspect of the present disclosure, the first flow path may comprise a flow path which extends straight to the long-side surface. By virtue of this configuration, the coolant can be surely brought into contact with the surface(s) of the long side(s).

In an aspect of the present disclosure, the rotor may further comprise a pawl section which extends from the inner surface of the rotor core defining a radially inner side of the at least one corresponding magnet slot toward the long-side surface and thereby fixes the at least one magnet. By virtue of this configuration, the surfaces of the long sides used for fixing the magnets can also be used as surfaces for wetting by the coolant. Further, the pawl is suppressed from obstructing the flow of the coolant along the surface(s) of the long side(s).

In an aspect of the present disclosure, the rotor may further comprise a pawl section which extends from the inner surface of the rotor core defining a radially inner side of the at least one corresponding magnet slot, contacts the long-side surface, and bends along the axial direction of the rotor core, and thereby fixes the at least one magnet. By virtue of this configuration, the surface(s) of the long side(s) used for fixing the magnet(s) can also be used as surface(s) for wetting by the coolant.

In an aspect of the present disclosure, one magnet and another adjacent magnet among the magnets may be arranged in a substantially V-shape where ends of the one and the other magnets are close to each other on an inner side in the radial direction of the rotor core. By virtue of this configuration, the magnets can be arranged in a manner which allows the magnets to be effectively used, and the surfaces of the long sides on the inner side in the radial direction can be effectively cooled.

In an aspect of the present teachings, a motor comprising a stator and one of the rotors as aforementioned may be provided. In the motor comprising such rotor, because the magnets are effectively cooled, it is easy to secure dynamic performance of the motor even in a high-load state where the magnets are at a high temperature, for example.

Hereinafter, embodiments of a motor disclosed herein will be described with reference to drawings. In the present teachings, when simply mentioning "radial direction/radially", it means a radial direction of a rotor core. When simply mentioning "circumferential direction/circumferentially", it means a circumferential direction of the rotor core. When simply mentioning "axial direction/axially", it means an axial direction of a rotor shaft.

Figure 1B:
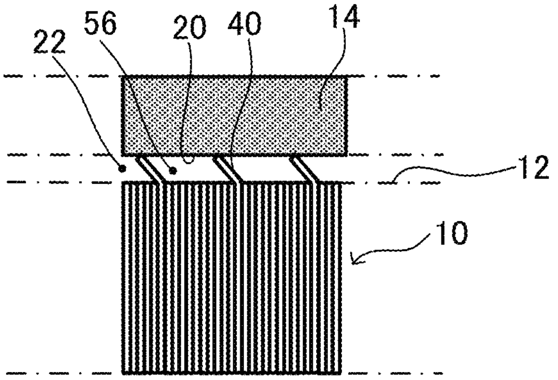
FIG. 1B is an enlarged view of a part of FIG. 1.
Figure 2:
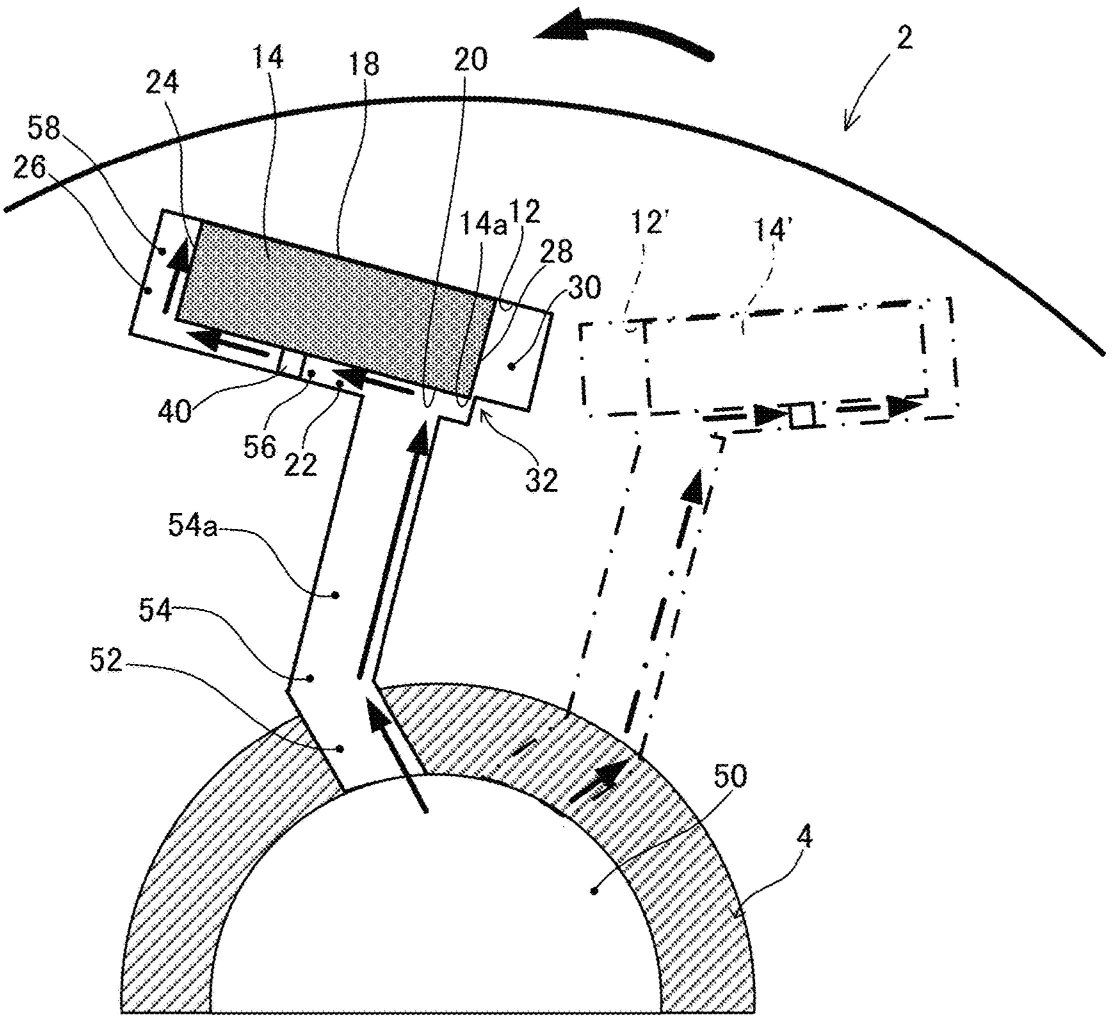
FIG. 2 illustrates a cross-sectional view taken along a line II-II in FIG. 1A.

FIG. 1A and FIG. 2 illustrate cross-sectional views of a rotor. FIG. 1A illustrates a cross-sectional view of a rotor 2 according to the present embodiment along the axial direction, FIG. 1B illustrates an enlarged view of a part of the rotor 2 in FIG. 1A, and FIG. 2 illustrates a II-II line cross sectional view of FIG. 1A, and it relates to magnets 14 disposed on a front side in a rotary direction of the rotor 2. The rotor 2 is a constituent feature of a motor. The motor may not be particularly limited, but for example, may be a motor generator configured to function as electric motor or generator. For example, it can constitute a traction power source for a vehicle by itself or with an engine.

As shown in FIG. 1A and FIG. 2, the rotor 2 comprises a rotor shaft 4, a rotor core 10 fixed rotatably around a central axis J along with the rotor shaft 4, and end plates 34, 36. The rotor shaft 4 is rotatably supported by bearings mounted on a not-shown housing of the motor.

Inside the rotor shaft 4, a coolant flow path 50 where the coolant can flow is defined in its axial direction. The coolant is not particularly limited, but for example, oil may suitably be used. The rotor shaft 4 further comprises a coolant flow path 52 which passes from the coolant flow path 50 through inside the rotor shaft 4 to extend radially outward and then communicates with a coolant flow path 54 in the rotor core 10.

The rotor core 10 is mainly composed of laminated steel plates, which are electromagnetic steel plates of magnetic substance such as iron or iron alloy that are laminated along an axial direction. The rotor core 10 is fixed to the rotor shaft 4 by a center hole passing through the rotor core 10 along the axial direction.

The rotor core 10 has one end and another end along the axial direction to which the end plates 34, 36, are fixed respectively. Each of the end plates 34, 36 is a flat plate. Each of the end plates 34, 36 communicates with a coolant flow path 56 to be described later and comprises a coolant groove 35, 37 which is open outward in the radial direction of the end plate 34, 36. Each of the coolant grooves 35, 37 is configured to discharge the coolant toward a not shown coil end of a coil of the motor.

The rotor core 10 comprises a plurality of magnet slots 12 extending through the rotor core 10 in the axial direction of the rotor core 10 along an outer circumferential side of the rotor core 10. A magnet (permanent magnet) 14 is accommodated in each of the magnet slots 12. A layout pattern for the magnet slots 12 in the rotor core 10 is not particularly limited, but for example, two magnets 14 each having a rectangular cross-sectional shape extending in a circumferential direction of the rotor core 10 are arranged in a pair to constitute one pole. The pair of magnets 14 are arranged substantially in a V shape where the magnets 14 are symmetrically angled toward the rotor shaft 4 for ends of the magnets that face each other to be closer to each other on the inner side in the radial direction. This is not particularly limiting, but six to eight poles are formed in the rotor core 10, for example.

A shape of the magnets 14 is not particularly limited, and for example, the shape may be a columnar body having an elongate cross-sectional shape and extending in the axial direction of the rotor core 10. Further, each of the magnet slots 12 is defined as a hole extending in the axial direction and having an opening in which the magnet 14 can be housed. Each of the magnet slots 12 may be a hole with a substantially elongate opening where the magnet 14 having an elongate cross-sectional shape can be housed.

Each of the magnets 14 is fixed by being pressed against a part of an internal surface of the rotor core 10 defining one of the magnet slots 12 (hereinafter, such internal surface will be referred to as the internal surface of the magnet slot 12). Each magnet 14 is fixed by its long side surface 18 on the radially-outer side of the magnet 14 being pressed against an internal surface of the rotor core 10 which defines an internal surface of the magnet slot 12 on the radially-outer side (hereinafter, such internal surface will be also referred to as an internal surface at a specific site of the magnet slot 12). At this occasion, as shown in FIG. 1B and FIG. 2, a pawl section 40 may be included which extends from the internal surface on the radially-inner side of the magnet slot 12 toward a surface 20 of a long side (long-side surface 20) on the radially-inner side of the magnet 14. The pawl part 40 compresses the magnet 14 against the internal surface on the radially-outer side of the magnet slot 12, i.e., outward in the radial direction of the rotor core 10. As shown in FIG. 1B and FIG. 2, a suitable number of the pawl section(s) 40 are arranged in an interval 22 extending along the axial direction and defined between the long-side surface 20 of the magnet 14 and the internal surface on the radially-inner side of the magnet 12.

As shown in FIG. 1B in particular, the pawl part 40 is tilted or turned oriented to one side of the axial direction from the internal surface on the radially-inner side of the magnet slot 12. When the magnet 14 is inserted into the magnet slot 12 having the pawl part 40, the pawl part 40 is tilted or turned in a direction along which the magnet 14 is inserted, by which the magnet 14 is fixed by being compressed outward against the magnet slot 12 in the radial direction.

As shown in FIG. 2, the magnet slot 12 includes the interval 22 between the long-side surface 20 of the magnet 14 and the rotor core 10 and an interval 26 between a surface 24 of a short side (hereafter, short-side surface 24) of the magnet 14 and the rotor core 10. The interval 22 and the interval 26 are communicated with each other along the axial direction. The interval 26 has its radially-outer side terminated by being enclosed by the internal surface on the radially-outer side of the magnet slot 12.

The magnet slot 12 further includes an interval 30 between another short-side surface 28 on the radially-inner side of the magnet 14 and the magnet slot 12, and the interval 30 also extends over the axial direction. A coolant flow blocker 32 is disposed between the interval 22 and the interval 30 by being encapsulated along the axial direction or being narrowed so as to greatly obstruct the coolant from flowing through. For example, as shown in FIG. 2, the coolant flow blocker 32 is arranged by the internal surface of the magnet slot 12 protruding inward in the opening so as to abut or be close to the long-side surface 20 of the magnet 14 and a corner 14*a* of the short-side surface 28 along the axial direction.

As shown in FIG. 1A and FIG. 2, the rotor core 10 comprises coolant flow paths 54, 56 configured to flow the coolant radially outward from the rotor shaft 4. The coolant flow path 54 supplies the coolant from the rotor shaft 4 toward the long-side surface 20 of the magnet 14 within the magnet slot 12. The coolant flow path 54 is an example of a first flow path disclosed herein.

The coolant flow path 54 connects the inside of the rotor core 10 from the coolant flow path 52 which passes through the rotor shaft 4 radially outward to the interval 22 in the magnet slot 12. The coolant flow path 54 is defined by the laminated steel plates constituting the rotor core 10 being notched at certain spots. As shown in FIG. 1A, the coolant flow path 54 may be branched into plural routes in the axial direction inside the rotor core 10.

As shown in FIG. 2, the coolant flow path 54 comprises a flow path 54*a* extending substantially straight to the long-side surface 20 exposed in the interval 22 of the magnet slot 12. The flow path 54*a* extending substantially straight to the long-side surface 20 means the flow path 54*a* abutting the long-side surface 20 for example at an angle of 75° or more to 105° or less, or for example at an angle of 80° or more to 100° or less, or for example at an angle of 85° or more to 95° or less. Due to this, the coolant flow path 54 curves in proximity to an outer circumference of the rotor shaft 4 to be oriented toward the long-side surface 20 as shown in FIG. 2 when the magnets 14 are arranged in the V shape.

As shown in FIG. 2, the coolant flow path 54 is configured to allow the coolant to be delivered radially outward from a radially-innermost portion of the long-side surface 20. That is, the coolant flow path 54 is configured to allow the coolant to be delivered to the long-side surface 20 disposed radially outside the coolant flow blocker 32 which the coolant flow path 56 comprises.

The coolant flow path 56 is configured to flow the coolant from the coolant flow path 54 radially farther outward. The coolant flow path 56 extends along the long-side surface 20 for an extent of almost entirely from radially inside the long-side surface 20 to radially outside the long-side surface 20. That is, the interval 22 from the magnet slot 12 constitutes the coolant flow path 56. The interval 22 extends along the axial direction inside the rotor core 10, and thus the coolant flow path 56 is configured to allow the coolant to flow in the axial direction also. Further, the coolant flow path 56 communicates with the coolant grooves 35, 37 of the end plates 34, 36. The coolant flow path 56 is an example of a second flow path disclosed herein.

The rotor core 10 further comprises a coolant flow path 58. The coolant flow path 58 is configured to allow the coolant to flow from the long-side surface 20 to the short-side surface 24 located farther on the radially outer side. The coolant flow path 58 is constituted by the interval 26 between the short-side surface 24 and the magnet slot 12. The interval 26 extends inside the rotor core 10 along the axial direction and thus the coolant flow path 56 is configured to allow the coolant to flow along the axial direction also. The coolant flow path 58 is a part of the second flow path disclosed herein.

Next, coolant flow on how the coolant flows in the rotor 2 configured as such when the motor operates will be described with reference to FIG. 2.

The flowing direction of the coolant is shown by arrows in FIG. 2 and the rotary direction of the rotor 2 is shown by a bold arrow. As shown in FIG. 2, the coolant flows into the coolant flow path 54 of the rotor core 10 from the coolant flow paths 50, 52 of the rotor shaft 4. The coolant having flowed into the coolant flow path 54 travels radially outward as the coolant clings to a rear side of the coolant flow path 54 in the rotary direction due to centrifugal force accompanying the rotation of the rotor 2.

Since the coolant flow path 54 comprises the flow path 54*a* extending substantially straight to the long-side surface 20 of the magnet 14, the coolant can be surely allowed to abut the long-side surface 20.

The coolant further reaches the coolant flow path 56. The coolant flow blocker 32 is arranged on a radially-innermost portion of the coolant flow path 56. The coolant flow blocker 32 obstructs the coolant from moving rearward in the rotary direction, which comprises obstructing it from moving into the interval 30. That is, the coolant is stored in a part on the radially outer side relative to the coolant flow blocker 32. As a result of this, since the coolant is stored in the part on the radially outer side relative to the coolant flow blocker 32, the coolant is controlled to travel in the coolant flow path 56 along the long-side surface 20 radially outward. That is, the coolant travels radially outward as the coolant clings to the long-side surface 20. At the same time, the coolant travels within the coolant flow path 56 in the axial direction also as the coolant clings to the long-side surface 20.

As a result of this, the long-side surface 20 of the magnet 14 is wetted by the coolant and thus cooled from the inner side toward the outer side in the radial direction and also along the axial direction.

The coolant further reaches the coolant 58. The short-side surface 24 is disposed on the radially outer side and the rear side in the rotary direction, and thus the coolant moves as it clings to the short-side surface 24 due to the centrifugal force. At the same time, the coolant travels in the coolant flow path 58 in the axial direction also as the coolant clings to the short-side surface 24. Further, the coolant may be stored in a radially outermost portion of the coolant flow path 58. As a result of this, the short-side surface 24 of the magnet 14 is wetted and cooled by the coolant from the inner side to the outer side in the radial direction and also over the axial direction.

According to the present embodiment, the long-side surface 20 and the short-side surface 24 of the magnet 14 housed in the magnet slot 12 can be wetted from inside the rotor shaft 4 then via inside the rotor core 10. The magnets 14 can effectively cooled by using centrifugal force. Also, processing of the end plates 34, 36 for cooling the magnets 14 with the coolant is not necessary, but the magnets 14 can be effectively cooled. Furthermore, there may be cases where additional components such as the end plates 34, 36 can be omitted.

According to the present embodiment, it is advantageous that the interval 22 for the pawl 40 to fix the magnet 14 to the magnet slot 12 and the other interval 26 can be used as the coolant flow paths 56, 58.

According to the present embodiment, it is advantageous that a great amount of the coolant can be allowed to reach the long-side surface 20 and the short-side surface 24 of the magnet 14 because there is the coolant flow blocker 32 so that the coolant can be stored near the coolant flow blocker 32.

Although in the above embodiment the coolant flow blocker 32 is defined by the corner 14*a* of the magnet 14 and the internal surface of the magnet slot 12, this is not limiting and it can be defined by filling a filler such as resin in this site. Further, the coolant flow blocker 32 may not be configured to block the coolant entirely along the axial direction, thus the intervals 22, 30 may partially communicate each other to a degree by which the coolant can be allowed to flow to the long-side surface 20.

Although in the above embodiment the one pawl section 40 is arranged on the long-side surface 20 of the magnet 14, this is not limiting and a plurality of pawl sections may suitably be arranged.

Although in the above embodiment one magnet slot 12 and the magnet 14 that are located on the front side in the rotary direction and form one pole are described, this is not limiting. For example, as shown in imaginary lines in FIG. 2, another magnet 14' and another magnet slot 12' arranged in a V shape and constituting a pole can also allow the coolant to cool a long-side surface on the radially inner side of the magnet 14' by configuring the other magnet 14' and the other magnet slot 12' symmetrically relative to the magnet slot 12 and the magnet 14. Here, for the other magnet 14' and the other magnet slot 12' disposed on the rear side in the rotary direction, a coolant flow blocker may be omitted. This is because even if such blocker is not provided, the coolant is pressed by centrifugal force to reach the long-side surface located on the rear side in the rotary direction as well as on the radially outer side.

The present teachings include following items based on the above description.

[Item 1] A rotor comprising: a rotor shaft; a rotor core attached to the rotor shaft and comprising a plurality of magnet slots and magnets, wherein at least one magnet of the magnets has an elongated cross-sectional shape and is fixed by being pressed against a part of an inner surface defining at least one corresponding the magnet slot of the rotor core, wherein the rotor is configured so that coolant flowing through the rotor shaft reaches a surface of a long side of the at least one magnet that is exposed inward in a radial direction of the rotor core in the corresponding magnet slot and moves along an axial direction of the rotor core.

[Item 2] The rotor according to item 1, further comprising: a first flow path which communicates with a coolant flow path flowing through inside the rotor shaft and extends to be oriented outward in the radial direction toward the long-side surface in the rotor core; and a second flow path which extends from the first flow path outward in the radial direction along the long-side surface.

[Item 3] The rotor according to item 2, wherein the second flow path extends substantially in an entire range from radially inside the long-side surface to radially outside the long-side surface.

[Item 4] The rotor according to item 2, wherein the second flow path extends from the long-side surface to a short-side surface of the at least one magnet which is exposed continuously to a radially outer side in the at least one corresponding magnet slot in the radial direction of the rotor core.

[Item 5] The rotor according to item 2, wherein the second flow path comprises a coolant flow blocker which blocks the coolant from flowing inward in the radial direction of the rotor core.

[Item 6] The rotor according to item 2, wherein the first flow path comprises a flow path which extends straight to the long-side surface.

[Item 7] The rotor according to item 1, further comprising a pawl section which extends from the inner surface of the rotor core defining a radially inner side of the at least one corresponding magnet slot toward the long-side surface and thereby fixes the at least one magnet.

[Item 8] The rotor according to item 1, further comprising a pawl section which extends from the inner surface of the rotor core defining a radially inner side of the at least one corresponding magnet slot, contacts the long-side surface, and bends along the axial direction of the rotor core, and thereby fixes the at least one magnet.

[Item 9] The rotor according to item 1, wherein one magnet and another adjacent magnet among the magnets are arranged in a substantially V-shape where ends of the one and the other magnets are close to each other on an inner side in the radial direction of the rotor core.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A rotor, comprising:

a rotor shaft;

a rotor core attached to the rotor shaft and comprising a plurality of magnet slots and magnets, wherein at least one magnet of the magnets has an elongated cross-sectional shape and is fixed by being pressed against a part of an inner surface defining at least one corresponding magnet slot of the magnet slots of the rotor core, wherein the rotor is configured so that coolant flowing through the rotor shaft reaches a surface of a long side of the at least one magnet that is exposed inward in a radial direction of the rotor core in the at least one corresponding magnet slot and moves along an axial direction of the rotor core; and a pawl section which extends from the inner surface of the rotor core defining a radially inner side of the at least one corresponding magnet slot, contacts the long-side surface, and inclines or bends with respect to the axial direction of the rotor core when the at least one magnet is inserted into the at least one corresponding magnet slot from one side in the axial direction of the rotor core, so as to press the at least one magnet radially outward, and thereby fixes the at least one magnet.

2. The rotor according to claim 1, further comprising:

a first flow path which communicates with a coolant flow path flowing through inside the rotor shaft and extends to be oriented outward in the radial direction toward the long-side surface in the rotor core; and a second flow path which extends from the first flow path outward in the radial direction along the long-side surface.

3. The rotor according to claim 2, wherein the second flow path extends from radially inside the long-side surface to radially outside the long-side surface.

4. The rotor according to claim 2, wherein the second flow path extends from the long-side surface to a short-side surface of the at least one magnet which is exposed continuously to a radially outer side in the at least one corresponding magnet slot in the radial direction of the rotor core.

5. The rotor according to claim 2, wherein the second flow path comprises a coolant flow blocker which blocks the coolant from flowing inward in the radial direction of the rotor core.

6. The rotor according to claim 2, wherein the first flow path comprises a flow path which extends straight to the long-side surface.

7. The rotor according to claim 1, wherein one magnet and another adjacent magnet among the magnets are arranged in a substantially V-shape where ends of the one and the other magnets are close to each other on an inner side in the radial direction of the rotor core.

* * * * *